US006950091B2

(12) United States Patent
Wilson

(10) Patent No.: US 6,950,091 B2
(45) Date of Patent: Sep. 27, 2005

(54) COMPUTER INPUT MODULE USING LIGHT (INFRARED OR LASER) SWITCHES

(75) Inventor: David M. Wilson, Hudson, FL (US)

(73) Assignee: Opti-Storm, LLC, Gulfport, FL (US)

( * ) Notice: Subject to any disclaimer, the term of this patent is extended or adjusted under 35 U.S.C. 154(b) by 400 days.

(21) Appl. No.: 10/243,082

(22) Filed: Sep. 12, 2002

(65) Prior Publication Data

US 2004/0051697 A1 Mar. 18, 2004

(51) Int. Cl.[7] .................................................. G09G 5/08
(52) U.S. Cl. ....................................... 345/158; 345/166
(58) Field of Search ................................ 345/156, 158, 345/163, 166, 173, 179, 165

(56) References Cited

U.S. PATENT DOCUMENTS 5,717,427 A * 2/1998 Lin ........................... 345/163
6,654,001 B1 * 11/2003 Su ............................. 345/156
6,707,027 B2 * 3/2004 Liess et al. ................. 250/221
6,859,196 B2 * 2/2005 Kehlstadt .................... 345/156
2002/0093487 A1 * 7/2002 Rosenberg .................. 345/166
2003/0028136 A1 * 2/2003 Stager ........................ 602/21

* cited by examiner

*Primary Examiner*—Alexander Eisen
*Assistant Examiner*—Kimnhung Nguyen
(74) *Attorney, Agent, or Firm*—Dennis L. Cook, Esq.

(57) ABSTRACT

The present invention is a computer input module comprising: a base; a housing, attached to the base; and at least one set of light (infrared or laser) emitter and detector devices. The input module is adapted so as to generate output signals to a host computer based on the interruption of a light beam or beams between said adjustable emitter and detector devices. The preferred embodiment is a computer mouse wherein light switches, rather than the more typical buttons, are used to generate output signals from a computer mouse to its host computer (an "IR Mouse"). Another embodiment is a Wristband Mouse wherein a wristband replaces the base and housing.

22 Claims, 8 Drawing Sheets

COMPUTER INPUT MODULE USING LIGHT (INFRARED OR LASER) SWITCHES

FIELD OF INVENTION

The present invention relates to an input module to be used in conjunction with a host computer. More specifically, it relates an input module based on the use of infrared or laser switches to generate output signals to the host computer. The preferred embodiment is a computer mouse wherein infrared switches, rather than the more typical buttons, are used to generate output signals from the computer mouse to the host computer. Another embodiment is a Wristband Mouse.

BACKGROUND OF THE INVENTION

Carpal tunnel syndrome ("CTS"), a form of repetitive stress injury, typically affects office workers who work with computers. CTS occurs when the median nerve, which relays sensation from the palm of the hand and fingers, becomes pinched, usually by swelling of the tendons. This leads to numbness and sometimes pain of the fingers, hand, and sometimes the forearm. CTS is often caused by excessive repetitive movements of the arms, wrists or hands.

Treatment for CTS first involves adjusting the way the person performs a repetitive motion. In addition, it may involve immobilizing the wrist in a splint and/or short courses of anti-inflammatory drugs or injections of cortisone or steroids in the wrist. If CTS does not respond to conservative treatment, then surgery is often the next treatment option.

Because musculoskeletal disorders, including repetitive stress injuries, account for one third of all occupational injuries reported to the Bureau of Labor Statistics annually, employers are under increasing pressure from unions, workplace safety regulators, and health care providers to address this issue. Workers can reduce the likelihood of CTS arising through simple steps such as: keeping their wrists straight when using tools; avoiding flexing and extending their wrists repeatedly; minimizing repetitive motion; and resting their wrists. Employers can help workers take these steps by replacing old tools with ergonomically designed new ones. Consequently, there is and has been a wide variety of attempts to provide ergonomically designed tools, including computer input devices such as computer mouses, to meet the resulting demand.

Ergonomic improvements in computer mouses have included: changes in mouse housing shape (for example see U.S. Pat. Nos. 6,005,553 and 6,377,244); mouse housings/rests moldable to match a user's hand (for example see U.S. Patent App. Nos. 20010024192 and 20020075236); and mouse attachments and extensions (for example see U.S. Pat. Nos. 6,396,478 and 6,417,842). Although the prior art in this area includes a wide variety of innovations, these innovations consistently rely on pressure-actuated buttons to generate output signals to the host computer.

The present invention also has the potential of increasing user efficiency and the rate of activation of signals from an input module to a host computer. It is a more natural motion to raise a finger to point at the screen (as opposed to pressing a pressure-actuated button) when selecting an object on the screen. The use of infrared switches in the present invention will enable object selection using this more natural motion. Moreover, the use of infrared switches in the present invention will enable the activation of programs in a Windows™ environment by raising a finger completely through an infrared beam and returning it back through the infrared beam to its rest position. This will generate a signal similar to the 'double-click' (typically used for program activation) that is often difficult for older computer users.

It is an object of the present invention to provide an input module designed to reduce stresses on users' hands by using light-based switches (infrared or laser), rather than pressure-actuated buttons, to generate output signals.

It is another object of the present invention to increase user efficiency and the rate of activation of signals from an input module to a host computer.

It is another object of the present invention to provide a means of increasing user efficiency and the rate of activation of signals from an input module to a host computer while keeping both hands free to type on a keyboard.

SUMMARY OF THE INVENTION

The present invention is a computer input module comprising: at least one set of light (infrared or laser) emitter and detector devices; associated circuitry and wiring; and a support apparatus. The input module is adapted so as to generate output signals to a host computer based on the interruption of an infrared or laser light beam or beams between said emitter and detector devices. The preferred embodiment is a computer mouse wherein infrared switches, rather than the more typical buttons, are used to generate output signals from a computer mouse to its host computer (an "IR Mouse"). Another embodiment is a Wristband Mouse, which keeps both hands free to type on a keyboard while activating typical mouse button actions.

DESCRIPTION OF THE DRAWINGS

The invention will now be described, by way of example only, with reference to the accompanying drawings in which.

DETAILED DESCRIPTION OF THE PREFERRED EMBODIMENT

Figure 1:
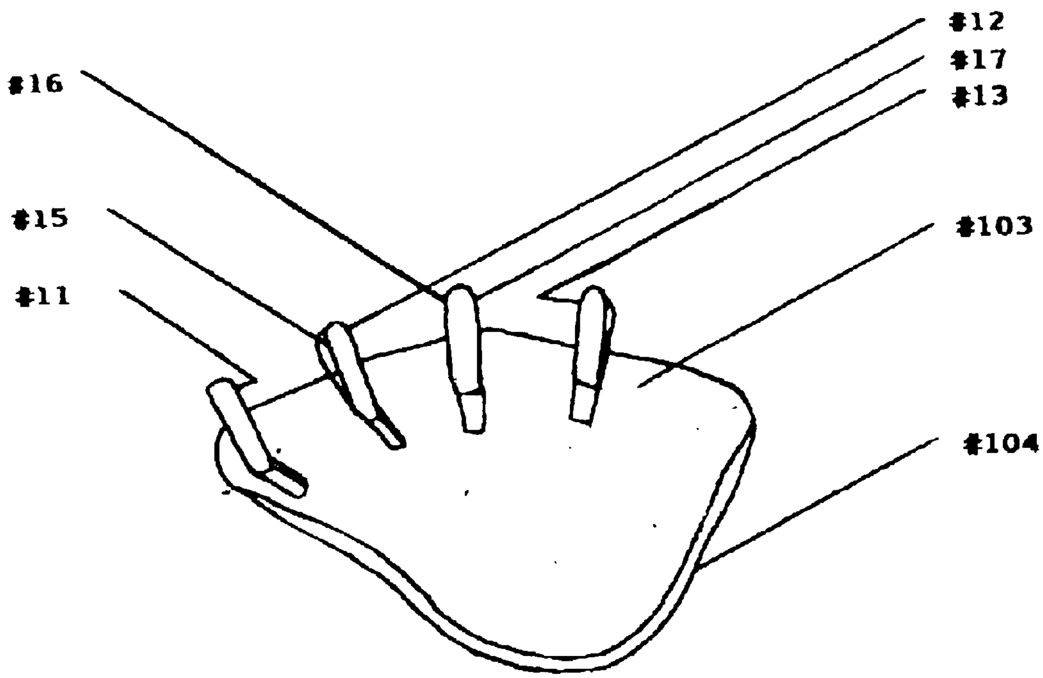
FIG. 1 is a perspective top view of an IR Mouse.
Figure 2:
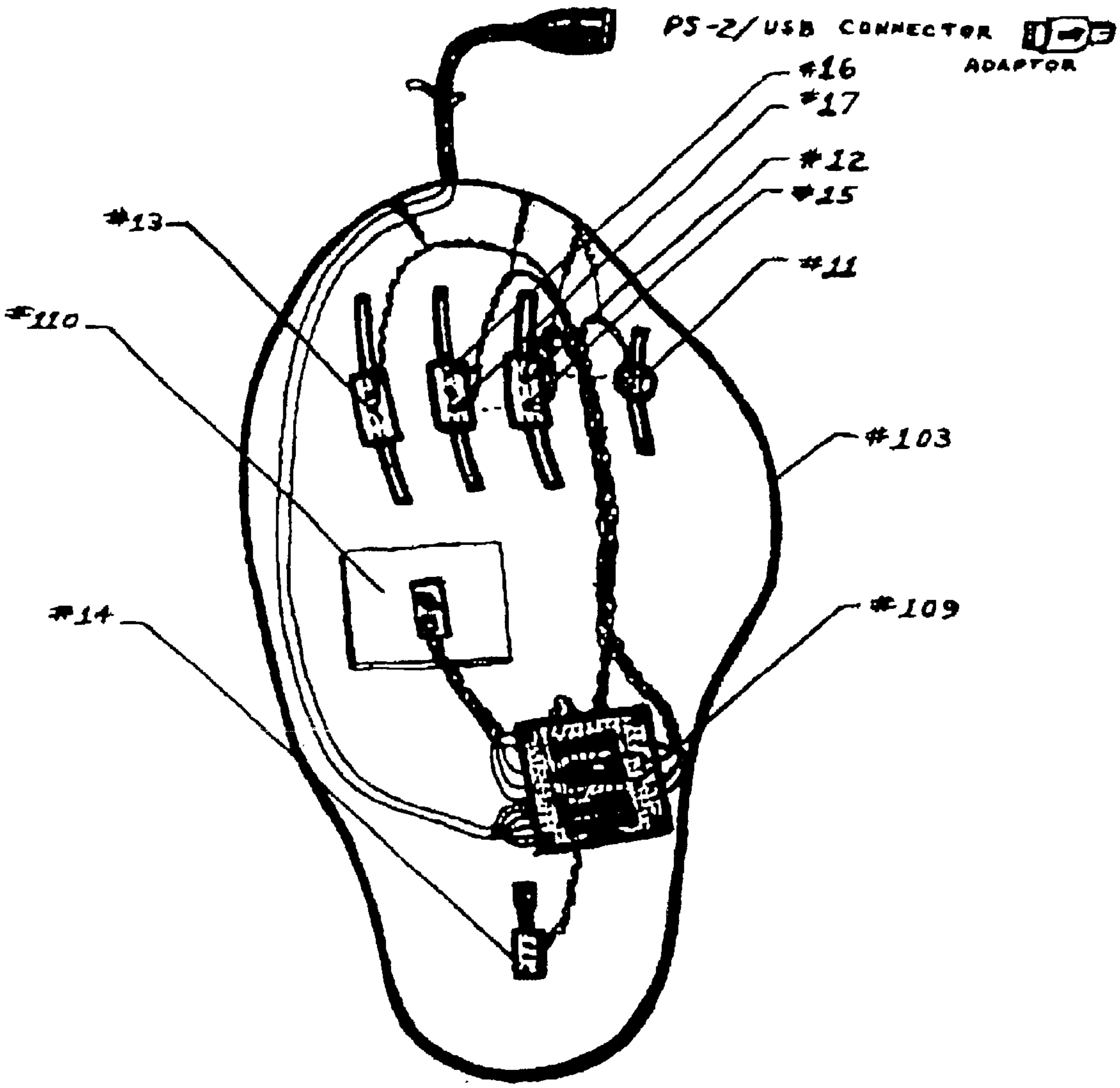
FIG. 2 is a bottom view, without the base, showing a wiring layout of an IR Mouse.
Figure 3:
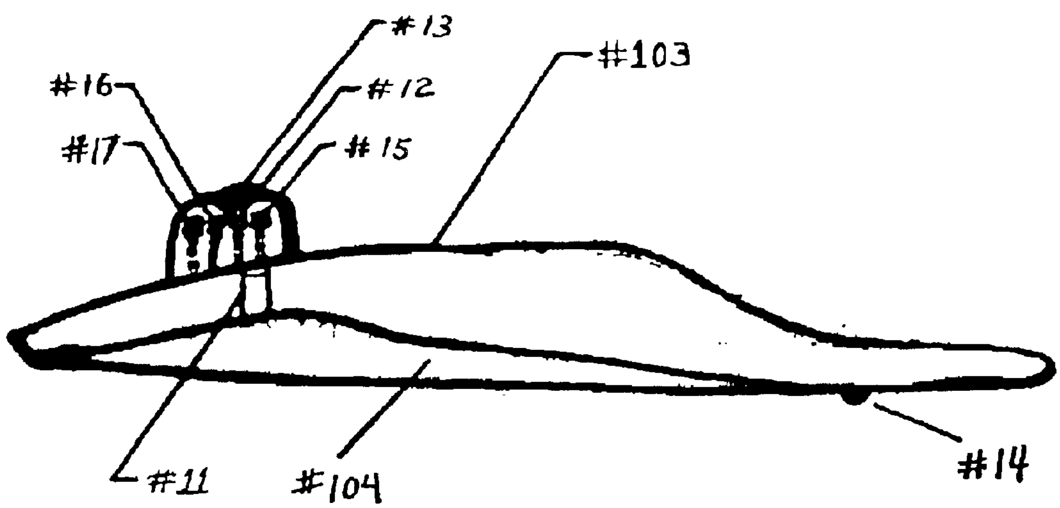
FIG. 3 is a side view of an IR Mouse.
Figure 4:
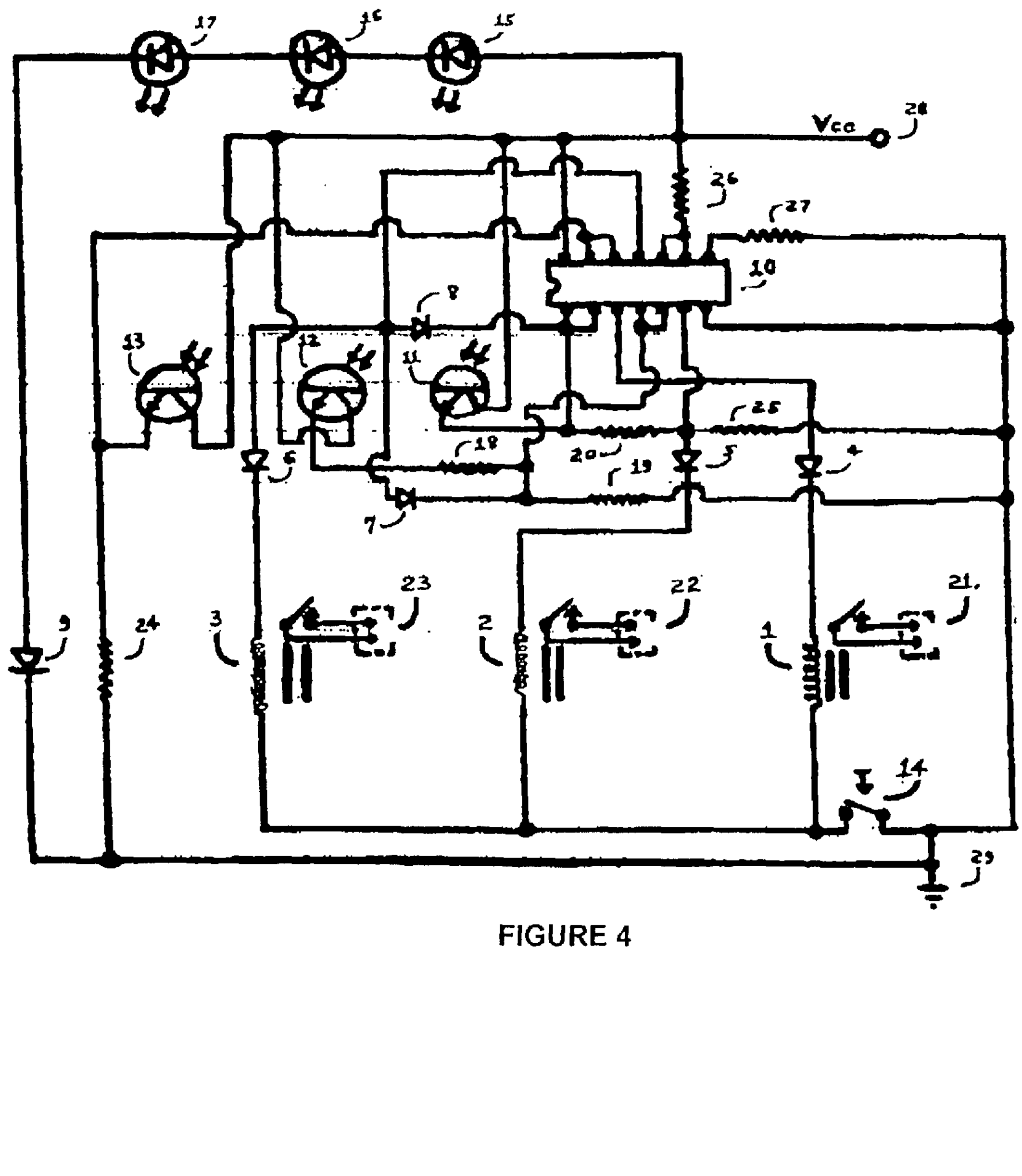
FIG. 4 is a schematic layout of circuitry of an IR Mouse.
Figure 5:
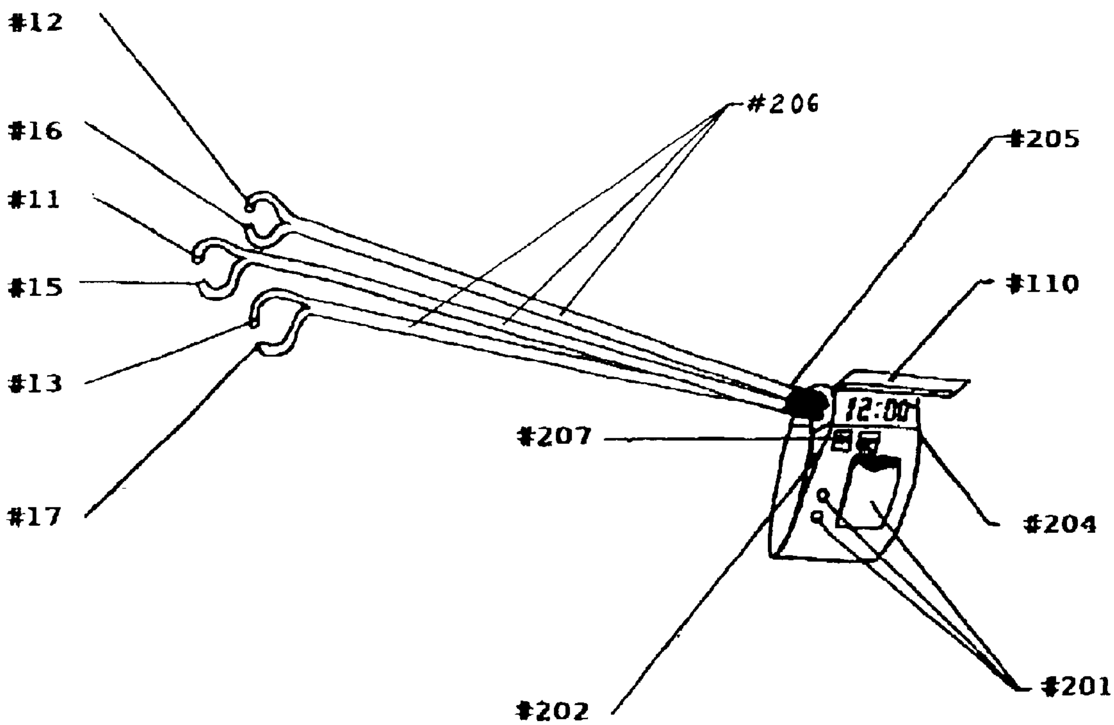
FIG. 5 is a side view of a Wristband Mouse.
Figure 6:
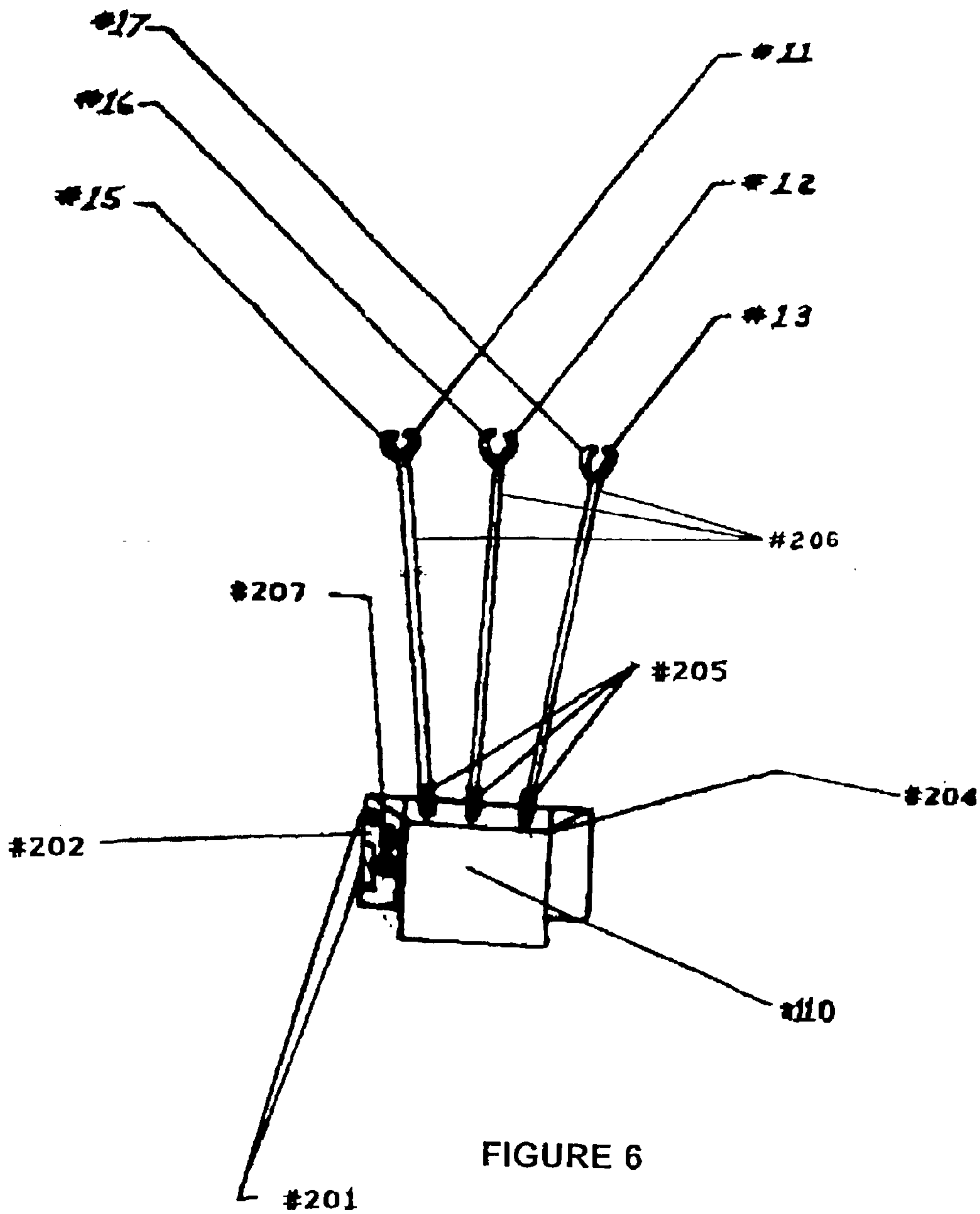
FIG. 6 is a top view of a Wristband Mouse.
Figure 7:
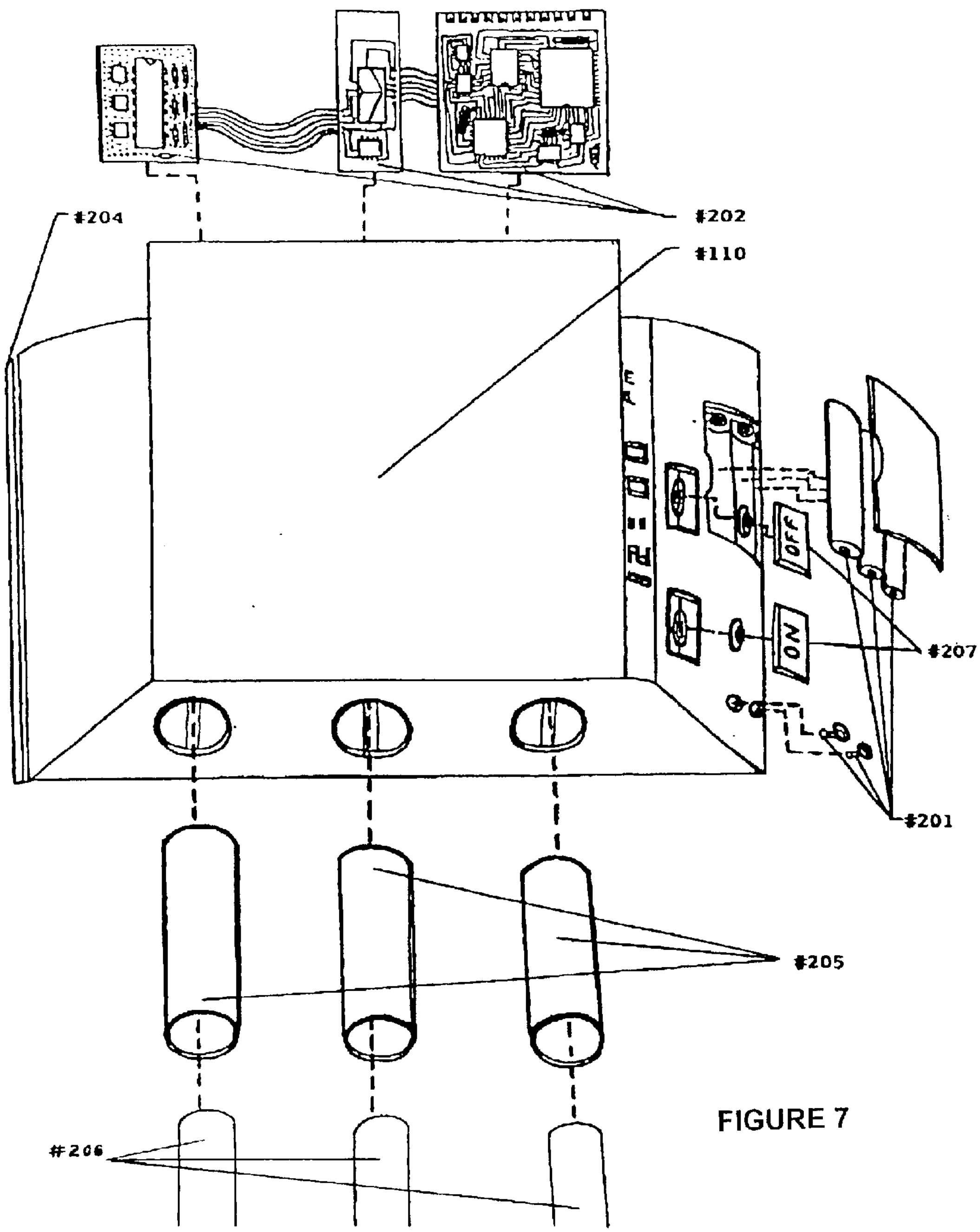
FIG. 7 is an expanded top view of a Wristband Mouse.
Figure 8:
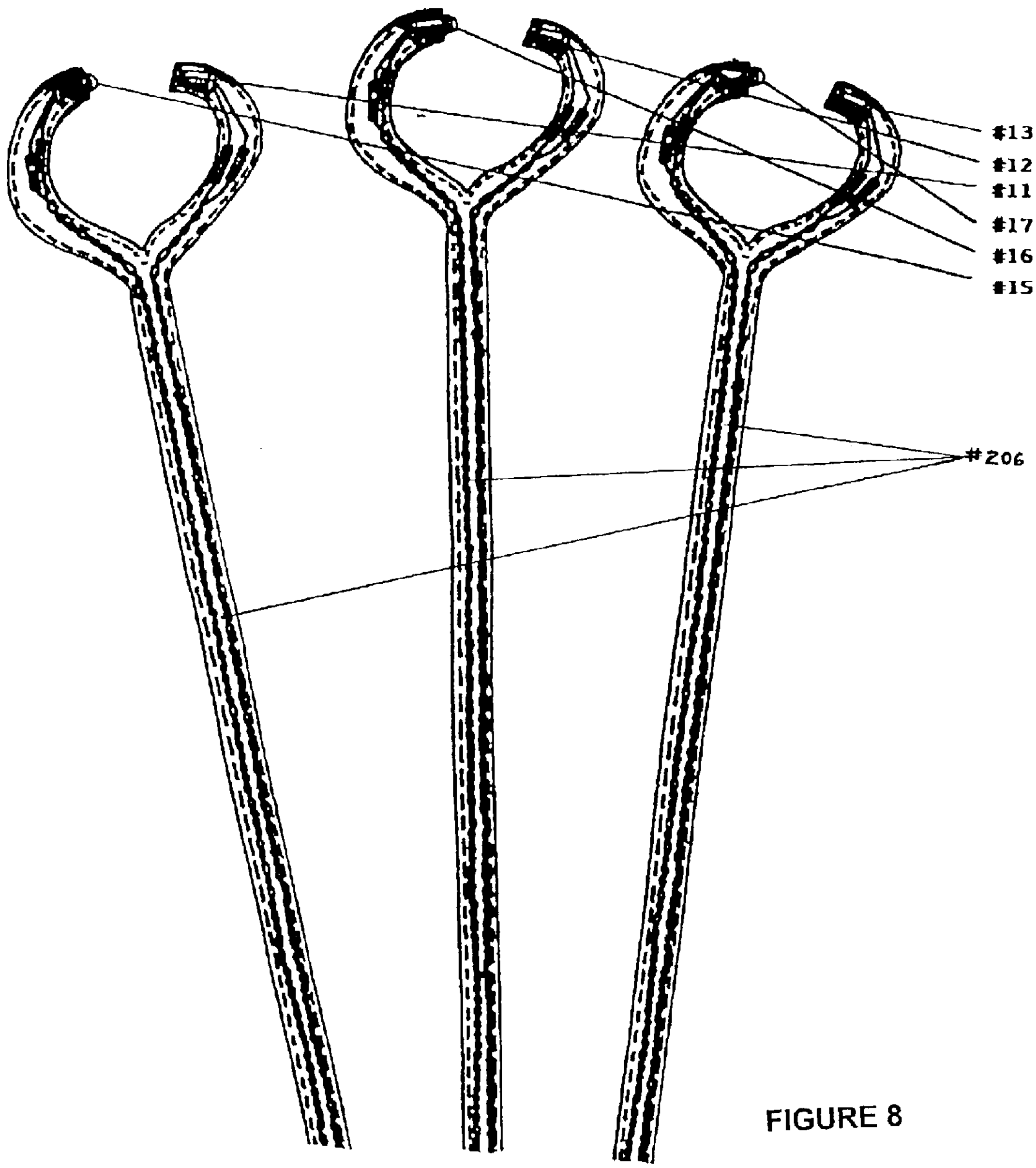
FIG. 8 is a cut away top view of the emitter/detectors of the Wristband Mouse.

The preferred embodiment of the present invention, the IR Mouse, is depicted graphically in FIGS. 1, 2 and 3 and schematically in FIG. 4. As shown in FIG. 1, a housing (103) is attached to a base (104). Adjustable infrared emitter devices (15, 16, & 17) and infrared detector devices (11, 12, & 13) protrude out of slots in said housing (103). As further shown in FIGS. 2 and 3 said housing also contains a micro-pressure switch (14), an internally mounted and controlled modular printed circuit board (109), and a cursor control device (110).

The micro-pressure switch (14) is attached to said base (104) inside said housing (103) and is adapted to respond to pressure on said housing (103). The micro-pressure switch (14) prevents output from said internally mounted and controlled modular printed circuit board (109) in the absence of pressure on said housing (103). When a user rests his or her hand on the housing (103), said micro-pressure switch (14) closes in response to the resulting pressure on said housing (103). This enables the generation of output signals through input/output relays (1, 2, & 3) and associated connectors (21, 22, & 23) as shown in FIG. 4 and also prevents the generation of output signals when a user is placing or removing his hand from the IR Mouse.

As shown in FIG. 2 the adjustable infrared emitter devices (15, 16, & 17) and infrared detector devices (11, 12, & 13) provide corresponding infrared light beams. The internally mounted and controlled modular printed circuit board (109) is electrically connected to the adjustable infrared emitter devices (15, 16, & 17) and infrared detector devices (11, 12, & 13). When the infrared detector devices (11, 12, & 13) detect an interruption of the infrared beam(s), the internally mounted and controlled modular printed circuit board (109) generates signals to the host computer. As implemented in the schematic shown on FIG. 4, the internally mounted and controlled modular printed circuit board (109) generates up to three independent input/output signals using the input/output relays (1, 2, & 3) through connectors (21, 22, & 23) in response to detected interruptions in the infrared beams.

The operation of the IR Mouse as shown schematically in FIG. 4 is discussed below by the way of example and explanation. A user rests his or her hand on the IR Mouse. The resulting pressure on said housing closes said micro-pressure switch (14) thereby enabling the mouse. This prevents inadvertent movement of the cursor or mistaken 'clicks' as the user initially places his or her hand on the mouse. By raising his or her index finger, the user interrupts the infrared light beam between the first emitter (15) and the first detector (11). In response to the resulting signal, the Quad 2-input NAND Schmitt Trigger (10) generates an output signal by energizing the first input/output relay (1) and connector (21).

By raising his or her middle finger, the user interrupts the infrared light beam between the second emitter (16) and the second detector (12). In response to the resulting signal, the Quad 2-input NAND Schmitt Trigger (10) generates a different output signal by energizing the second input/output relay (2) and connector (22). The circuitry is adapted to energize only the second input/output relay (2) even if the user also interrupts the first infrared light beam by raising both the middle and index fingers. This multi-finger feature allows for easier operation by accounting for the fact that the index finger is often reflexively raised with the middle finger when the middle finger is raised from a palm-down resting position.

By raising his or her ring finger, the user interrupts the infrared light beam between the third emitter (17) and the third detector (13). In response to the resulting signal, the Quad 2-input NAND Schmitt Trigger (10) generates a different output signal by energizing the third input/output relay (3) and connector (23). The circuitry is adapted to energize only the third input/output relay (3) even if the user also interrupts one or both of the other infrared light beams. Again, this multi-finger feature allows for easier operation by accounting for the fact that the index finger and/or middle fingers is/are often reflexively raised with the ring finger when the ring finger is raised from a palm-down resting position.

Diode (9) allows a forward bias voltage drop for the series connection of emitters (15, 16, & 17).

Resistors (26) and (27) tie unwanted inputs and output of the Quad 2-input NAND Schmitt Trigger Integrated circuit (10) to a Non-switching environment for the fourth quadrant NAND gate.

The VCC (28) is the direct Voltage Positive Input used to power the circuitry through the negative return to ground (29).

The cursor control device (110) can be any standard device used in input mouse devices that are well know to those skilled in the art.

The user will also be able to activate programs in a Windows™ environment by raising a finger completely through one of the infrared beams and returning it back through the infrared beam to its rest position. This will generate a signal similar to the 'double-click' (typically used for program activation with a mouse using pressure-actuated buttons) that is often difficult for older computer users.

Another embodiment of the present invention, the Wristband Mouse, is depicted graphically in FIGS. 5 through 8. As its name implies, said support apparatus of the Wristband Mouse is a wristband. In the present embodiment, said wristband supports and contains a battery pack (201), a cursor control device (110), and adjustable infrared emitter and detector devices (206). Said adjustable infrared emitter and detector devices, more clearly shown in FIG. 8, (206) are in communication with an internally mounted and controlled modular printed circuit board (202). This communication can be in the form of wired or fiber optic connections. Said modular printed circuit board (202) and associated wiring are based on the same wiring schematic shown in FIG. 4 and discussed in the IR Mouse description above. However, the Wristband Mouse is adapted to provide output signals though an internal transmitter. In addition, a manual on/off switch (207) mounted on the wristband replaces the micro-pressure switch used in the IR Mouse. The cursor control device (110) is shown in FIG. 4 as a touch sensitive mouse pad but could be any standard device used in input mouse devices that are well know to those skilled in the art.

The operation of the Wristband Mouse mirrors the operation that is discussed in the IR Mouse description above except that the Wristband mouse as shown in this embodiment does not allow for "double-clicking" by raising one's finger completely through the beam and back again, but rather the finger is raised twice in quick succession. It should be obvious to those skilled in the art that modifications could be made to the Wristband Mouse such that "double-clicking" in the manner of the IR Mouse is also accomplished and those modifications are included within the scope of this disclosure.

It is to be understood that the present invention is not limited to the embodiments described above, but encompasses any and all embodiments within the scope of the following claims.

I claim:

1. A computer input module comprising:

at least one set of light (including but not limited to infrared and laser) emitter and detector devices placed above a user's fingers;

associated circuitry and wiring; and a support mechanism;

said computer input module adapted so as to generate output signals to a host computer based on the interruption of a light beam or beams between said emitter and detector devices when the user raises his or her finger or fingers.

2. A computer input module as claimed in claim 1 further comprising:

a cursor control mechanism.

3. A computer input module as claimed in claim 2, wherein said support mechanism is comprised of a base and a housing, attached to the base.

4. A computer input module as claimed in claim 3, wherein said light emitter and detector devices are mounted on or through said housing so as to provide a light beam or light beams above the user's finger or fingers when a user's hand is placed on said support mechanism.

5. A computer input module as claimed in claim 4, wherein:

said light emitter and detector devices are adjustable in position.

6. A computer input module as claimed in claim 5, wherein said housing is shaped and adapted to ergonomically support a user's hand.

7. A computer input module as claimed in claim 6, further shaped and adapted to allow the user to interrupt the light beam(s) through finger movements of the supported hand.

8. A computer input module as claimed in claim 7, wherein the computer input module generates specified signals in response to the user's interruption of the light beam(s).

9. A computer input module as claimed in claim 8, wherein said adjustable emitter and detector devices are adapted so as to provide a first light beam, a second light beam, and a third light beam.

10. A computer input module as claimed in claim 9, further adapted so as to generate a first output signal upon interruption of said first light beam.

11. A computer input module as claimed in claim 10, further adapted so as to generate only a second output signal upon interruption of said second light beam or interruptions of both said first and second infrared beams.

12. A computer input module as claimed in claim 11, further adapted so as to generate only a third output signal upon interruption of said third light beam or interruptions of said third light beams and either or both of said first and second light beams.

13. A computer input module as claimed in claim 3, further comprising: a micro-pressure switch located attached to said base so as to prevent the generation of output signals unless the user's hand is resting on said housing.

14. A computer input module as claimed in claim 2, wherein said support mechanism is comprised of a wristband.

15. A computer input module as claimed in claim 14, wherein said light emitter and detector devices are mounted on said wristband, extending radially outward above the user's fingers so as to provide a light beam or beams above the user's fingers.

16. A computer input module as claimed in claim 15, wherein:

said set of light emitter and detector devices are adjustable in position.

17. A computer input module as claimed in claim 16, further shaped and adapted to allow the user to interrupt the light beam(s) through finger movements of his or her hand on the arm where the wristband is being worn.

18. A computer input module as claimed in claim 17, wherein the computer input module generates specified signals in response to the user's interruption of the light beam(s).

19. A computer input module as claimed in claim 18, wherein said adjustable emitter and detector devices are adapted so as to provide a first light beam, a second light beam, and a third light beam.

20. A computer input module as claimed in claim 19, further adapted so as to generate a first output signal upon interruption of said first light beam.

21. A computer input module as claimed in claim 20, further adapted so as to generate only a second output signal upon interruption of said second light beam, or interruptions of both said first and second light beams.

22. A computer input module as claimed in claim 21, further adapted so as to generate only a third output signal upon interruption of said third light beam or interruptions of said third light beams and either or both of said first and second light beams.

* * * * *